United States Patent [19]

Alonso-Amelot

[11] Patent Number: 5,178,061
[45] Date of Patent: Jan. 12, 1993

[54] FORAGE COMPACTION APPARATUS WITH CONSTANT ANGLE ROTOR

[75] Inventor: Francisco R. Alonso-Amelot, Maracaibo-Perijá, Venezuela

[73] Assignee: Sistema de Desarrollo y Communications, C.A., Maracaibo, Venezuela

[21] Appl. No.: 621,021

[22] Filed: Nov. 30, 1990

[51] Int. Cl.⁵ .................. A01F 25/16; A65G 3/04
[52] U.S. Cl. ................................ 100/65; 100/100; 100/144; 141/114; 198/642
[58] Field of Search ............... 100/65, 144, 145, 177, 100/189, 100; 141/71, 114; 242/75.41, 75.42, 75.43, 156.2; 198/642

[56] References Cited

U.S. PATENT DOCUMENTS

| | | | |
|---|---|---|---|
| 3,029,038 | 4/1962 | Lotz | 242/75.41 |
| 3,076,618 | 2/1963 | Van Hook | 242/75.42 |
| 3,132,429 | 5/1964 | Etnyre | 198/642 X |
| 3,454,171 | 7/1969 | Lundahl | 198/642 X |
| 3,687,061 | 8/1972 | Eggenmüller et al. | 100/145 X |
| 3,899,143 | 8/1975 | Slezak | 242/75.43 |
| 4,046,068 | 9/1977 | Eggenmüller et al. | 100/145 X |
| 4,236,444 | 12/1980 | Seffrood | 100/65 |
| 4,308,901 | 1/1982 | Lee | 100/65 X |
| 4,502,378 | 3/1985 | Cullen | 100/65 |
| 4,567,820 | 2/1986 | Munsell | 100/145 X |
| 4,621,666 | 11/1986 | Ryan | 100/177 X |
| 4,653,553 | 3/1987 | Cox et al. | 100/65 X |
| 4,688,480 | 8/1987 | Ryan | 100/144 |
| 4,724,876 | 2/1988 | Ryan | 100/144 X |
| 4,949,633 | 8/1990 | Johnson et al. | 100/145 X |

FOREIGN PATENT DOCUMENTS

| | | | |
|---|---|---|---|
| 2005218 | 8/1971 | Fed. Rep. of Germany | 100/65 |
| 2261436 | 6/1974 | Fed. Rep. of Germany | 100/145 |

Primary Examiner—Harvey C. Hornsby
Assistant Examiner—Stephen F. Gerrity
Attorney, Agent, or Firm—McGlew & Tuttle

[57] ABSTRACT

A forage compaction apparatus including a three point based chassis to contact the floor, that supports a hopper in its front end. The apparatus forming a tunnel in the rear end while housing a compacting rotor and retainer bars in the chamber between the front and rear ends. The forage is admitted into the hopper and packed into the tunnel by the effect of the rotor and associated retainer comb. These are designed specifically to create forces directed upwards and backwards in order to compact evenly the forage into an agricultural bag that closes the exit of the tunnel in the rearmost end of the apparatus. The apparatus has a power transmission system and controls forward movement by braking the machine while compacting so that as the machine packs forage, pressure is built in a special way into the tunnel and agricultural bag so that the bag is unfolded in the field as the machine moves forward. The rotor design is such that forage is directed upwards by the sole action of rotor/retainer that fills the agricultural bag more evenly.

13 Claims, 10 Drawing Sheets

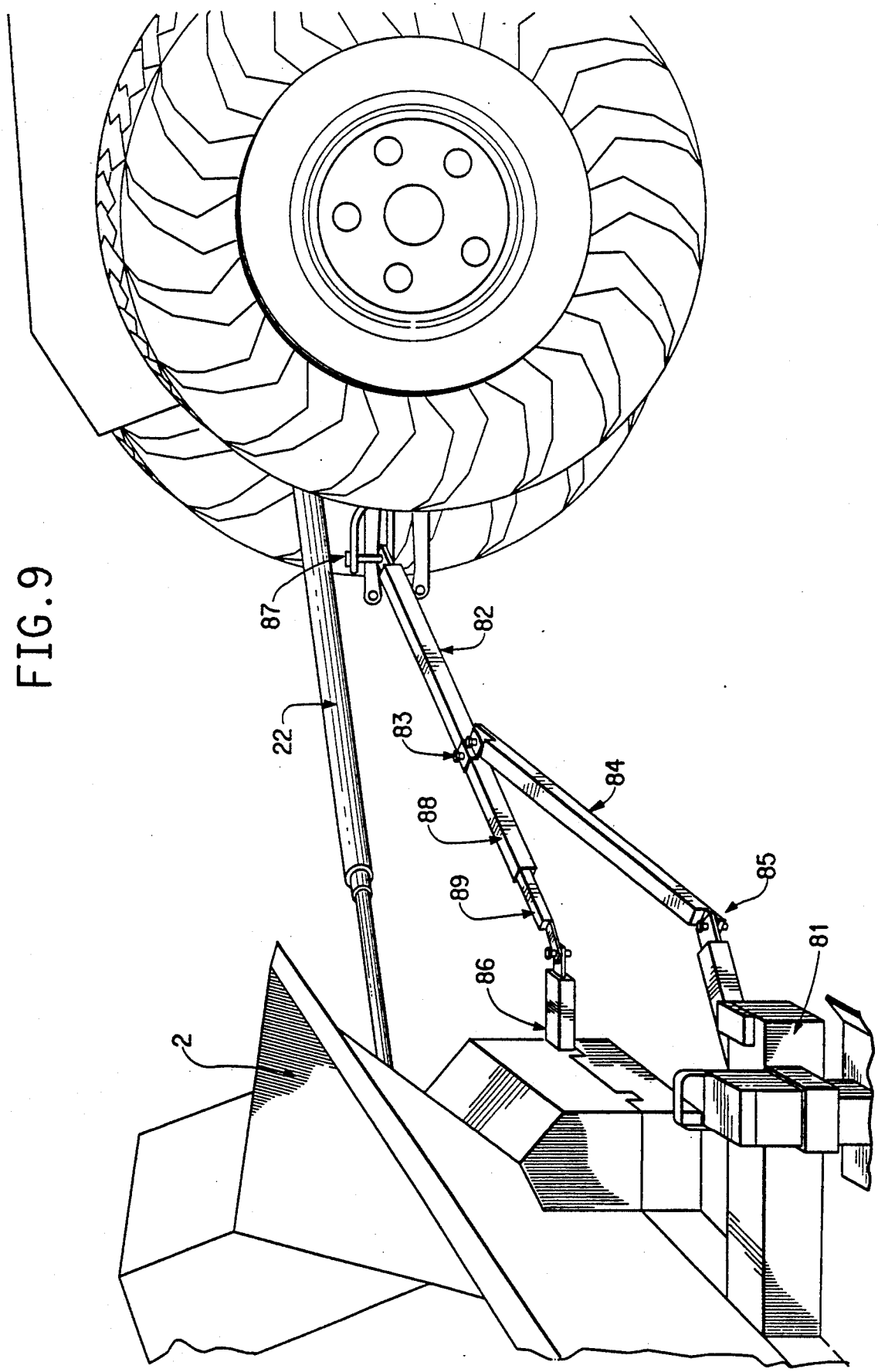

FORAGE COMPACTION APPARATUS WITH CONSTANT ANGLE ROTOR

TECHNICAL FIELD OF THE INVENTION

This invention relates several components that form an apparatus for the purpose of compaction of chopped forage into an expandable storage receptacle or agricultural bag. The pressure from compaction builds up in the agricultural bag and expels air from inside said bag. Anaerobic fermentation thus occurs in a very uniform manner throughout the bag. Pressures generated inside the agricultural bag are very evenly distributed due to elements in the design.

BACKGROUND OF THE INVENTION

Expansible storage receptacles or forage bags have become a common alternative to other ways of storing forage for the specific purpose of its preservation as silage. Different types of equipment have been built in order to fill the storage bags. In filing storage bags the bags must be evenly filled, with pressures equally distributed inside the bag, whether it is at the bottom, the top or the sides. In general terms, the degree of compaction at the bottom of the horizontal bag should be roughly the same as the degree of compaction in the upper part of the bag since it is mostly a horizontal structure with heights that do little to increase pressure. So far, most of the machines that have been built, push the forage into the bag by different means. The simplest is "pushing" in the general area of the bottom of the support for the bag that is being filled in order to generate enough pressure to push up the chopped forage. This way, the agricultural bag is filled by the creation of a very large pressure at the bottom areas. Because of this, large amounts of energy are required to fill the bag and a large difference in pressure, and therefore compaction, is created inside the bag. Several machines have developed a device that resembles a ski ramp that helps with the concept and the necessity to push up the forage. A main point has been missed in the filling process. By filling on one side of the bag (the bottom) there is a much greater pressure in this area (the floor area) of the bag than in the center or the top. This pressure gradient determines that the forage in the bottom is packed at very high pressure with tissue damage, while the forage at the top is not fully packed and leaving enough air to cause spoilage. This causes the forage to ferment unevenly.

Devices are known from the prior art of forage, as discussed above and include the device proposed by Eggenmiller et al. (U.S. Pat. No. 4,046,068. This reference proposes an apparatus for bagging forage including compression roller means with a roller having a shaft with a plurality of rigid tines arranged progressively spiraled around the circumference. Deflector means are provided cooperating with a molding channel, a basket and a roller to assure the absence of gaps within the completed feed to product form.

Johnson et al. (U.S. Pat. No. 4,949,633) and Ryan (U.S. Pat. No. 4,621,666) disclose similar arrangements including a basic process of compaction of forage by the use of different elements, normally a rotor. These patents (including Eggenmiller, U.S. Pat. No. 4,046,069) emphasize the distribution of prongs or teeth that are located along the axle of the rotor. The teeth are described as being located in a spiral sequence along the axle with variable degrees of advance between teeth, being located in an irregular spiral with randomly located teeth or groups of teeth along the axle, or even combinations of all of the above. These references all focus on the concept of pushing the forage out of a receptacle in front of the machine into a shaping tunnel where the agricultural bag is held. Other concepts are considered concerning the application of a braking force (in a back stopping cables or in the main wheels of the machine), wherein different devices are employed as the source of the braking force.

SUMMARY AND OBJECTS OF THE INVENTION

It is an object of the present invention to provide a superior structure and method for filling agricultural bags in order to achieve a better pressure gradient within the bag, and to have this method and apparatus consume less power than the power consumed by prior art devices and processes.

According to the invention, an apparatus is provided including a hopper, a tunnel, a compaction device, a braking system and a power transfer system. These elements are supported by a chassis which is in turn supported on the ground by two wheels and a ski or ski-like structure. This arrangement provides an apparatus that is fully on the ground and is not leaning against a tractor or based upon turnable wheels. In this way, the device is more stable than devices of the prior art and is less complex than devices of the prior art.

The chassis is preferably formed by a double H-shaped beam structure. The front end is designed to receive the chopped forage and preferably includes a hopper or a feed table that allows the forage to move in front of the central part of the chassis. The compaction device is preferably positioned at the central part of the chassis, between the hopper and the tunnel receiving structure.

The compaction device is provided with teeth which are specifically designed to capture the chopped forage and drive it into the tunnel receiving structure with the double effect of pushing and lifting the mass of forage, even at a slow rate of rotation. This effect is achieved by a specific design of the teeth in combination with a set of bars directed downwardly and forwardly providing a specific association of forces with the compaction teeth for the effect of lifting (as described herein below).

The tunnel receiving structure is connected to the compaction device for receiving and retaining the chopped forage. The tunnel receiving structure is designed to allow pressure to build up within the tunnel receiving structure. The tunnel receiving structure is provided to stop a general lifting force created by the compaction device. This lifting force is generally directed rearwardly and upwardly and therefore the force is applied to the top or leaf of the tunnel. If the force is directed rearwardly such that the force is not applied to the tunnel top, the lifting effect would act as a pushing force instead of a lifting force. The tunnel roof thereby cooperates with the lifting force to stop the forage from being pushed upwardly and thus creates a generally even pressure distribution within the tunnel receiving structure.

A brake system is designed to permit the apparatus to build up pressure by having a frame that supports a net behind the exit of the tunnel. This structure is provided at the rear of the apparatus. The brake system is formed by a set of drums with cables wound around a drum in a single layer. The drums are retained in position by a braking band that covers about two thirds of the surface of the drum with a special pressure generating lever and a screw to tighten the band over the drums. The drums are held together by a steel bar.

A power transfer system is formed by the association of a power take off (hereinafter abbreviated PTO) shaft that connects the apparatus to a tractor or similar power generating unit. The PTO is connected to a gear box that transfers the tractor rotational movement by sprockets and chains to the compaction device. The normal rotation rate is relatively slow such the chopped forage is damaged as little as possible while maintaining a high rate of compaction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 9 is a general view of the connection system between the forage compactor and the tractor, in the traditional way.

DESCRIPTION OF THE PREFERRED EMBODIMENT

Figure 1A:
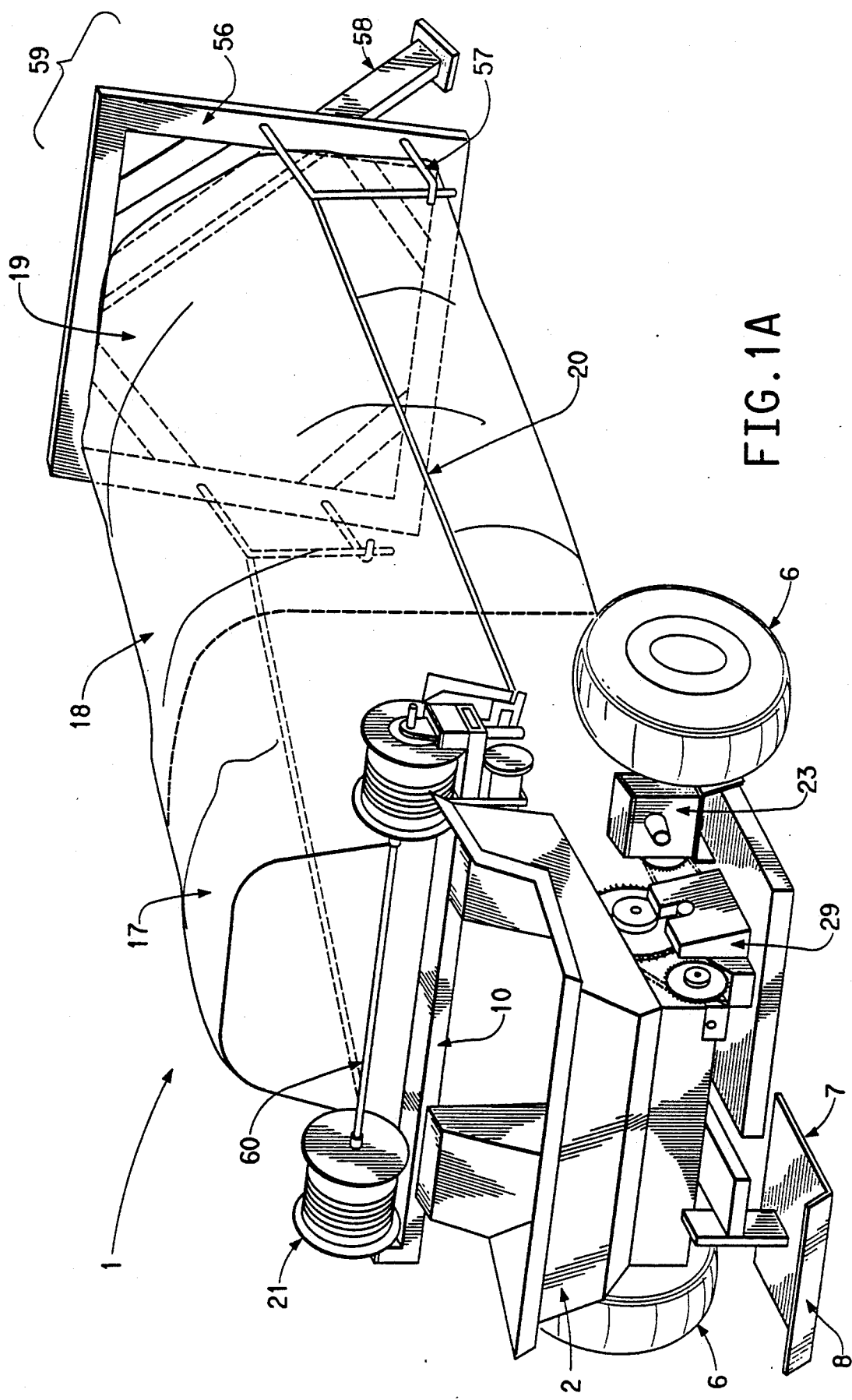
FIG. 1A is a side view of the Power Transfer System as located on the machine.
Figure 1B:
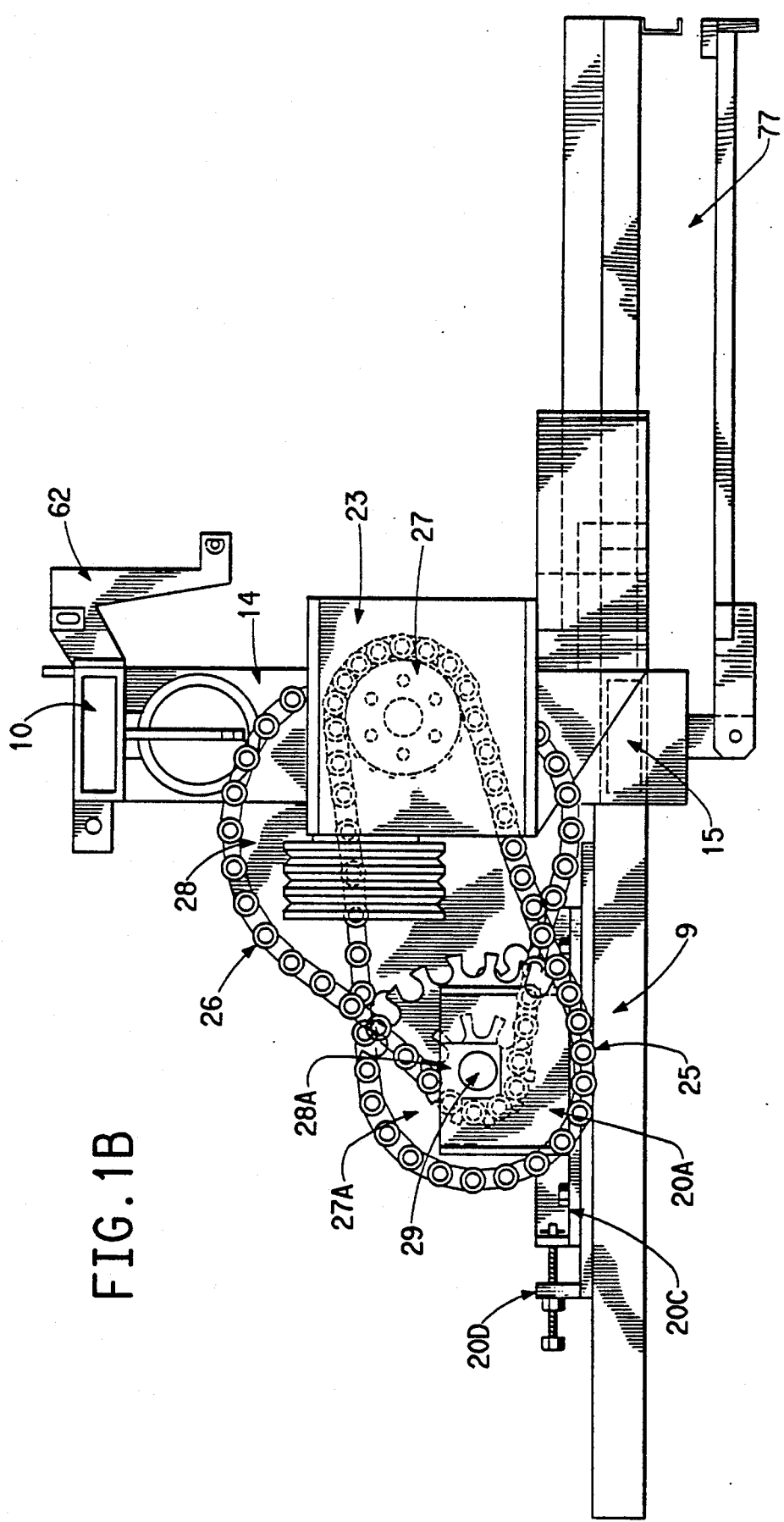
FIG. 1 is a perspective view of the agricultural bag loading apparatus in general, in the working position, with an agricultural bag in place.

Referring to the drawings and in particular to FIG. 1, the invention comprises an apparatus for forage compaction including a machine generally designated 1 with a receptacle for collection of forage in a front part. The machine includes a hopper generally designated 2. An apparatus is provided for support including two wheels 6 provided on the side and a ski 7 in the front. This structure forms a triangular support.

The wheels 6 are slightly rearward in order to share the weight with the ski 7. A flat plate is provided in front of the machine, slightly elevated in the forward most edge in order to allow the ski 7 to slide over the ground. The ski arrangement allows the apparatus to contact the ground by a larger surface area than if only wheels were used. In this way, less pressure is exerted on particular areas of the ground. This is desirable as most areas destined for agricultural use are soft. This allows the apparatus a potential for sliding forward in a more regular way than if the main body of the apparatus were supported by elements of a lesser surface area.

The structure allows for forage to be cut in the field and transported to the compactor by the use of an agricultural wagon or similar device. The forage is then transferred into the apparatus by the hopper. Other devices such as a side conveyor and feed table may also be used. The arrangement merely requires a supply of a steady flow of chopped forage into the compaction device.

As shown in FIG. 1A a main frame 9 is provided. This frame is preferable directly attached to the two wheels 6 on the sides and preferable attached to the ski 7 in the front thereby holding the main beams close to the floor whereby the center of gravity is low. The frame 9 provides a direct support in both the upper part and the lower part of the elements of the apparatus. The main beam 10 supports the brake system 11 and the retainer 12, which must hold a specific angle with respect to the rotor 13. As seen in FIG. 1A, two vertical beams 14 are provided below the main beam 10 that hold the lower beam 15. This provides a central passageway 38 and provides the support structure 9A projecting in the forward direction for support of the hopper 2 or another receiving system. Supporting elements for wheel 16 are connected to the lower beam 15 on both sides of the main frame. This provides a strong and rigid support. Behind the main frame 9 there is provided a structure 17 for the purpose of holding the agricultural bag and also for the additional purpose of allowing the forage to compact. This structure is preferable semi-cylindrical in shape. Since the exit of the structure or tunnel 17 is closed by a bag 18, and the bag leans against a net 19 the bag is prevented from moving. The tunnel becomes a pressure chamber where the forage is to be compacted. The net that closes the tunnel exit is part of the braking apparatus 11.

Figure 7:
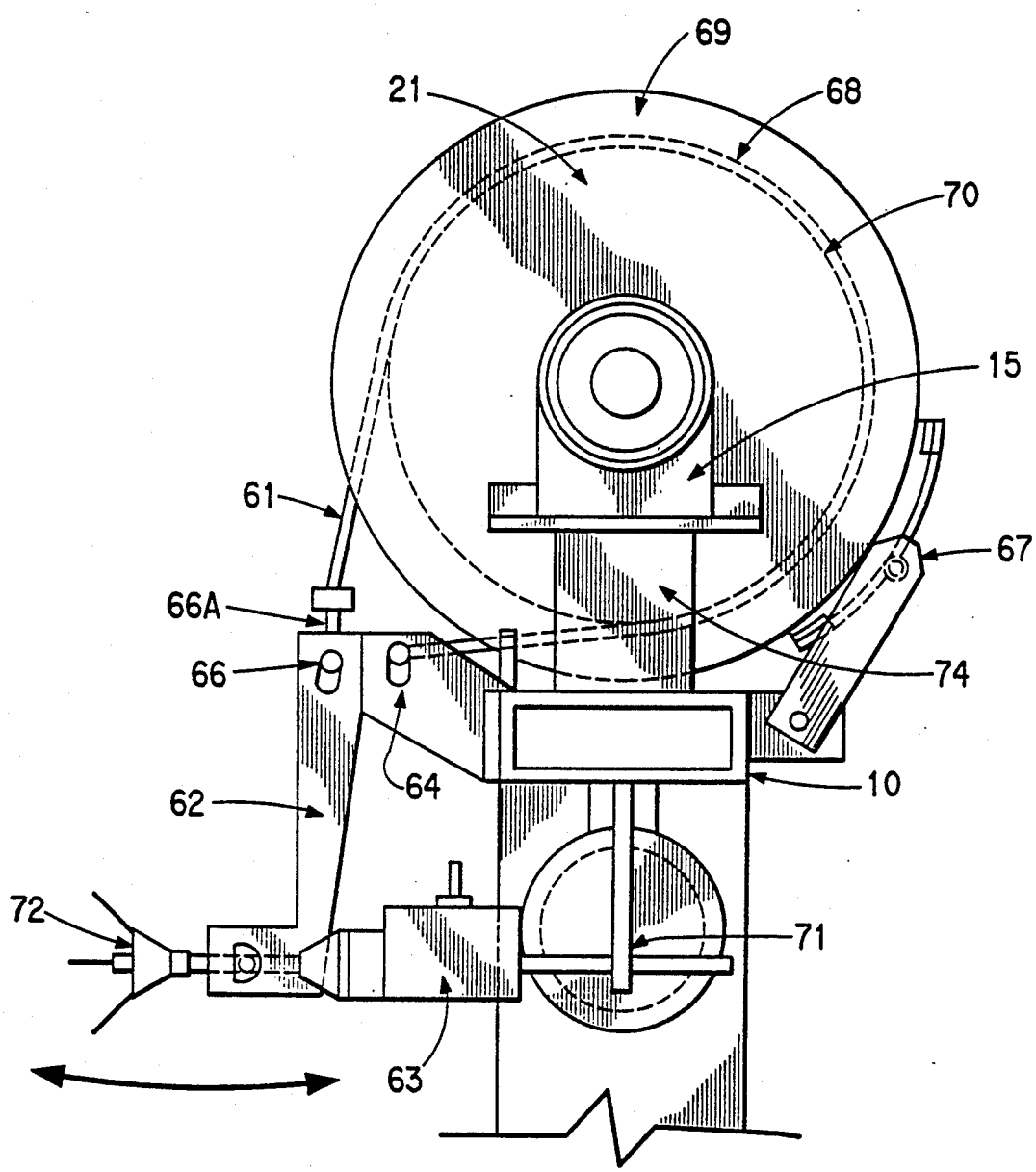
FIG. 7 is a lateral view of the braking apparatus as mounted over the main frame and the drum.
Figure 8:
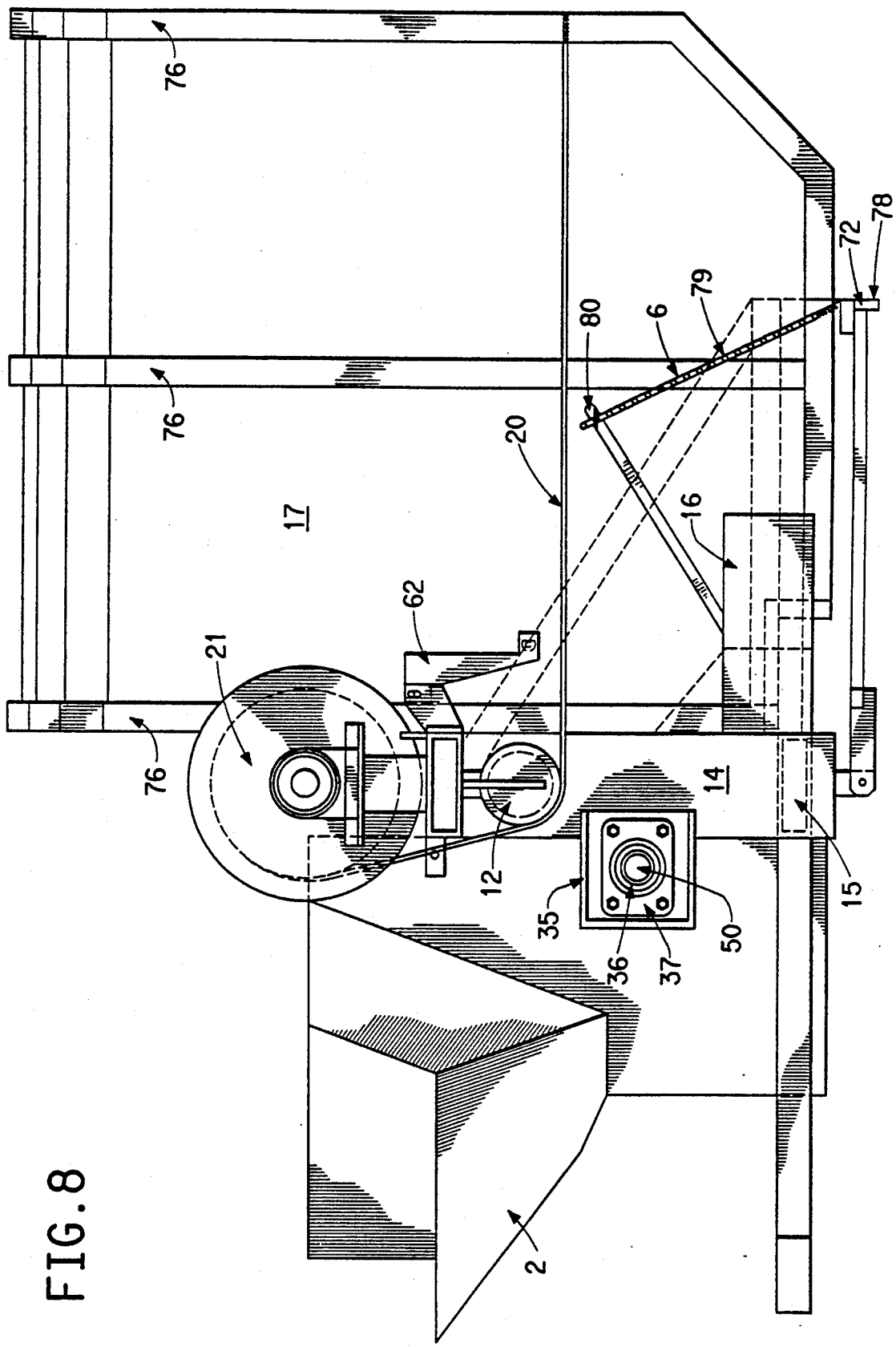
FIG. 8 is a lateral view of the forage compactor with details on the cable support and the bag pan retaining system.

Braking apparatus 11 is attached to the main frame 9 by cables 20 that are wound in drums 21 which cannot move freely, thereby preventing the cables from unwinding. Said drums 21 (see FIG. 7) are tubular structures supported by short towers 74. The short towers 74 are supported over the upper beam 10. On top of upper beam 10 there are pillow blocks 75 that hold a steel bar 60 and link the two drums 21.

The forces start in the compaction device 5 at the front end of a power transfer system. The compaction system may have different shapes and is preferably built at the end of a power take off (PTO) shaft 22 of a tractor, although it could have its own power source, other than the tractor. Hydraulic power, mechanical power by direct reduction of a rotation rate, mechanical power by indirect reduction of a rotation rate with the use of roller (the described embodiment) may all be used. In the preferred embodiment a gear box 23 is connected where the PTO shaft enters. The connection may be directly, or indirectly by means of a side pulley 24. The power of the PTO shaft is directed to the gear box 23 where by mechanical reduction of the rate of rotation is decreased to near 180 turns per minute. By using roller chains 25, 26 and sprockets 27, 28, 27A, 28A the rotation rate is decreased to a rate of 65 in a transfer axle 29 where the two said sprockets 27A, 28A are welded together. The sprocket 27A and 28A turn at the same rate causing a predictable and adjustable reduction of the turning rate of the system. The dual sprockets 27A and 28A connect the roller chain 25 from the gear box 23 and the second roller chain 26, where power is transmitted to a main sprocket 28 that turns at 36 turns per minute approximately. The main sprocket is directly attached to a rotor 13, of the compaction device 5 in such a way that the sprocket drives the rotor where both turn at the same rate. All this is supported by the chassis in a quite rigid form so as to allow adequate compaction. The transfer axle 29 is supported by ball bearings 20A that are attached to pillow blocks 20B, being themselves supported by a tensioning slide 20C. The tensioning slide 20C is bolted downwards to the frontal projection of the main frame 9. The tensioning slides 20C are driven each by a screw that links said slide 20C to a tension support 20D that permits the adjustment of roller chain 25, 26 tension. In order to guarantee tension, the gear box 23 is attached to a plate by bolts, having a front calibrating bolt 20E 25 by a backward slide of the gear box when needed.

Figure 2:
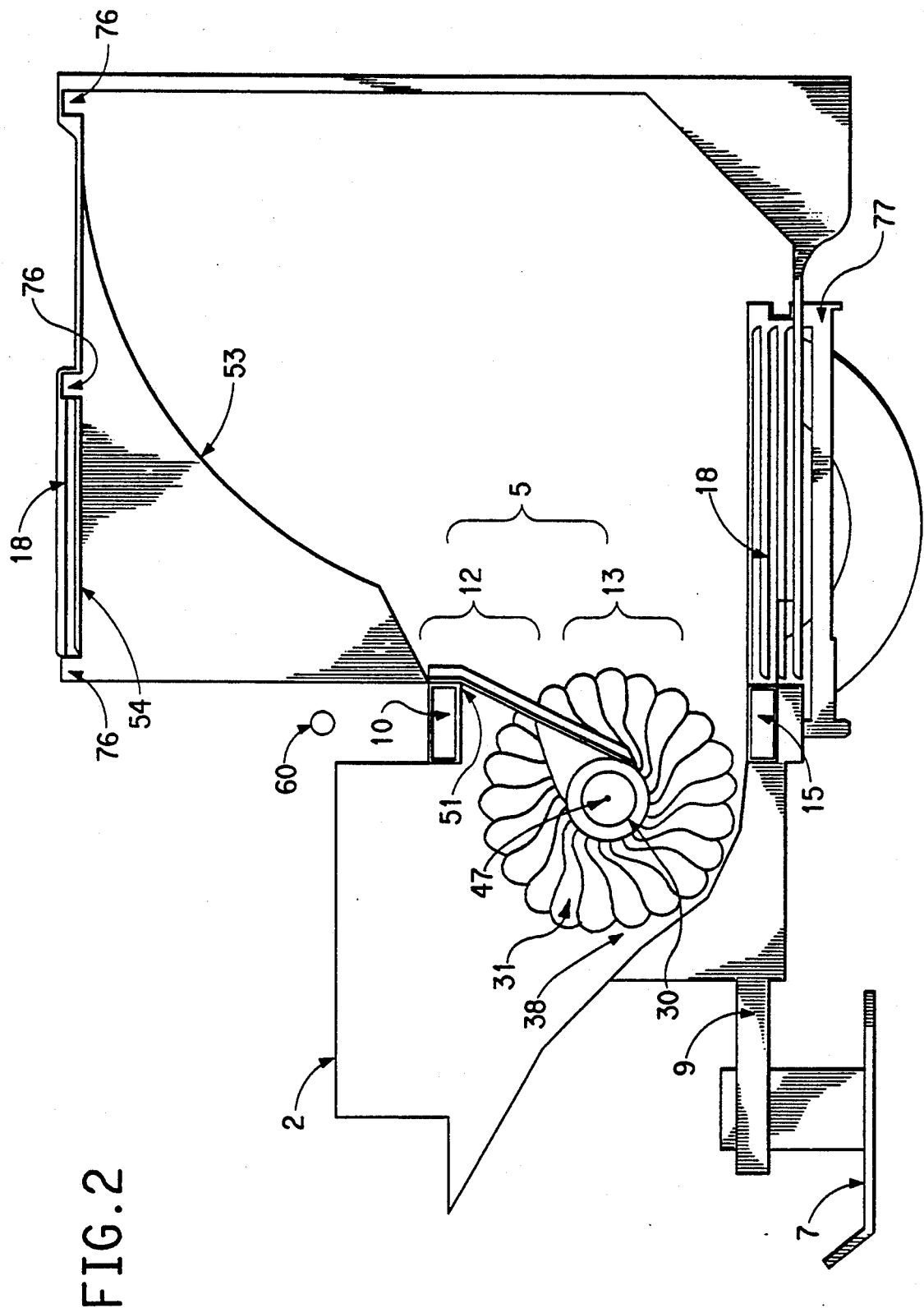
FIG. 2 is a sectional view in line A of the apparatus and showing the sequential arrangements of the components of the apparatus.
Figure 4:
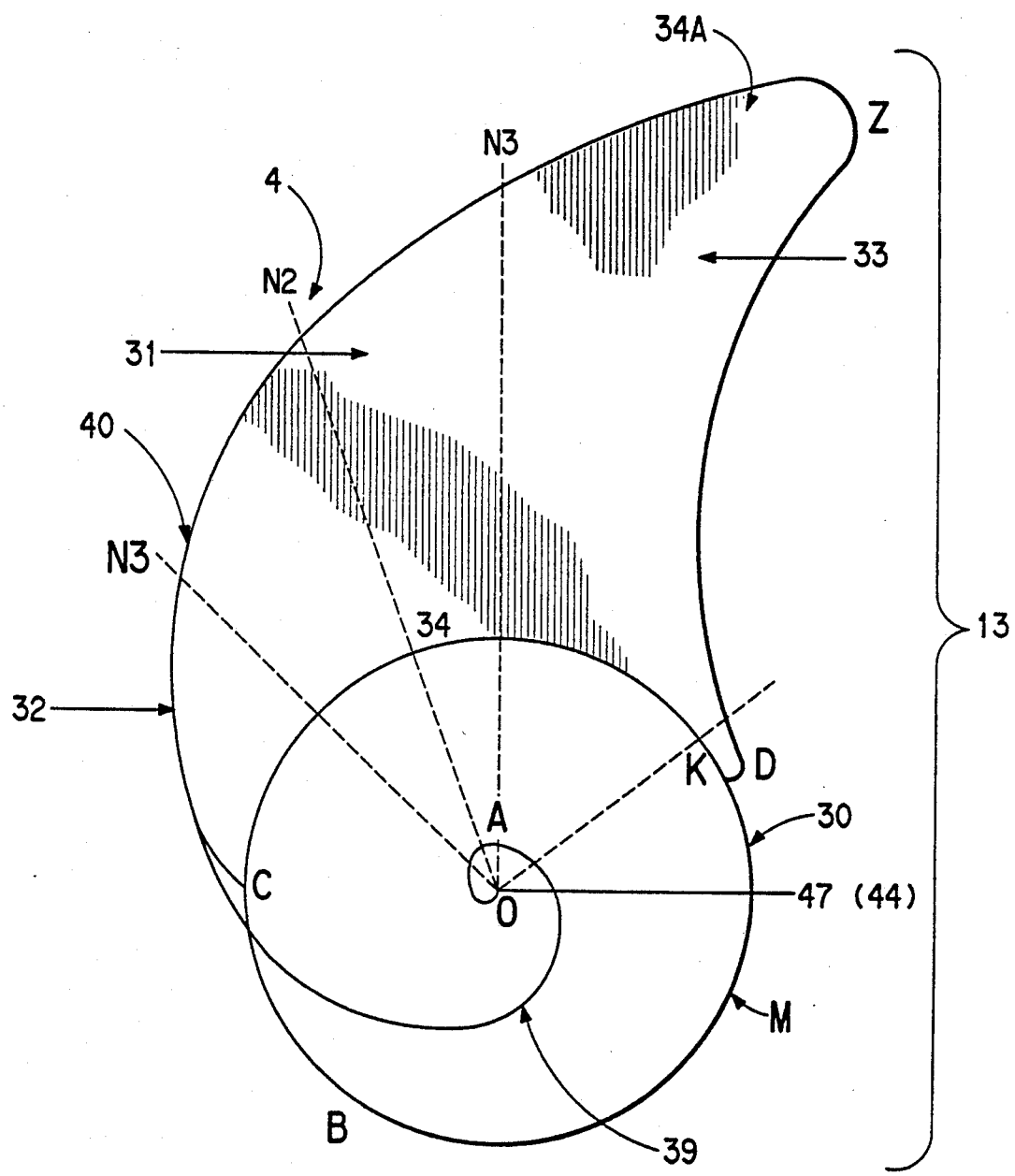
FIG. 4 is a lateral view of the rotor as the logarithmic spiral is expressed into the front edge of the teeth of the rotor.
Figure 5:
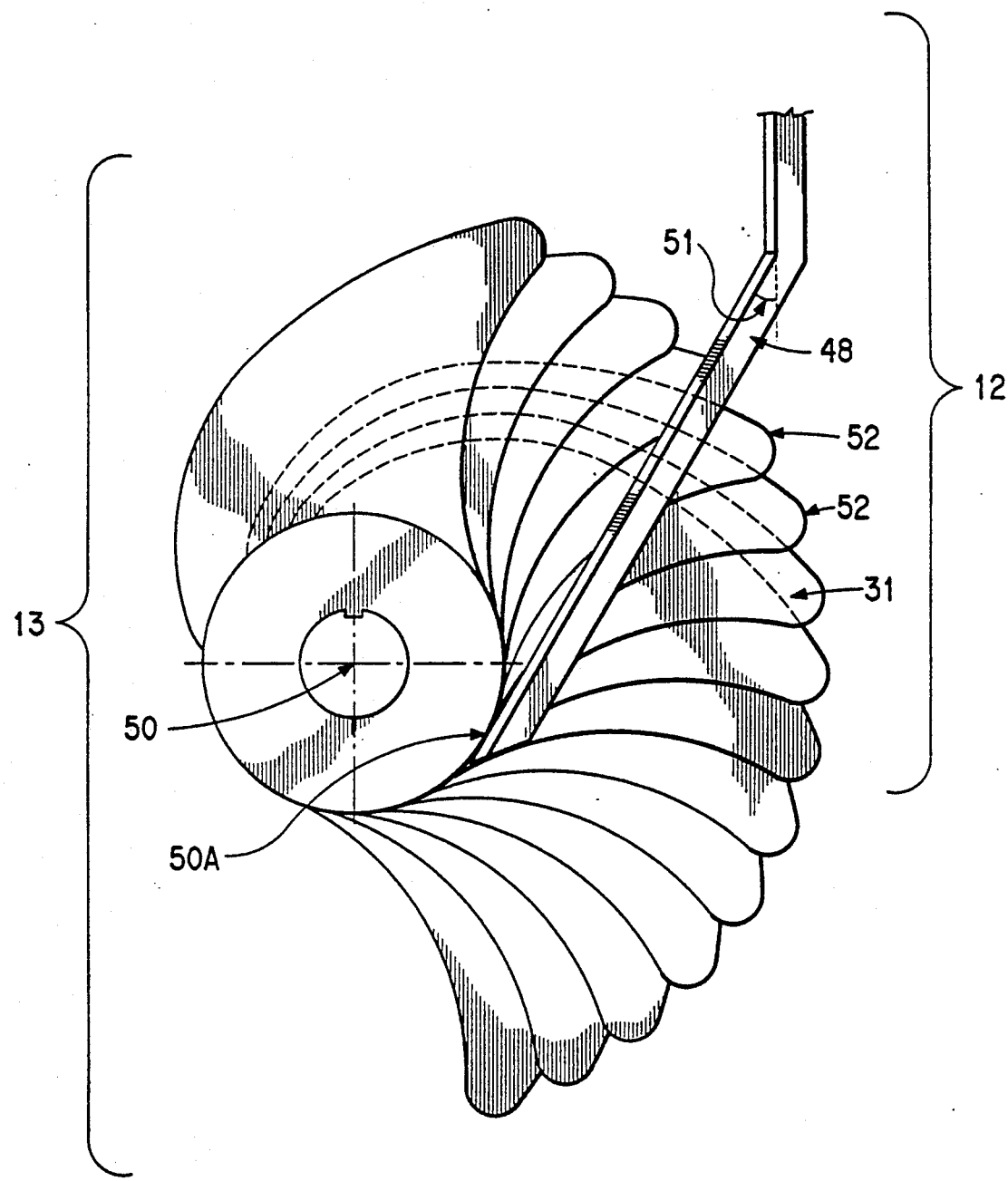
FIG. 5 is a lateral view of the rotor and the retainer in association to form the compaction device.
Figure 6:
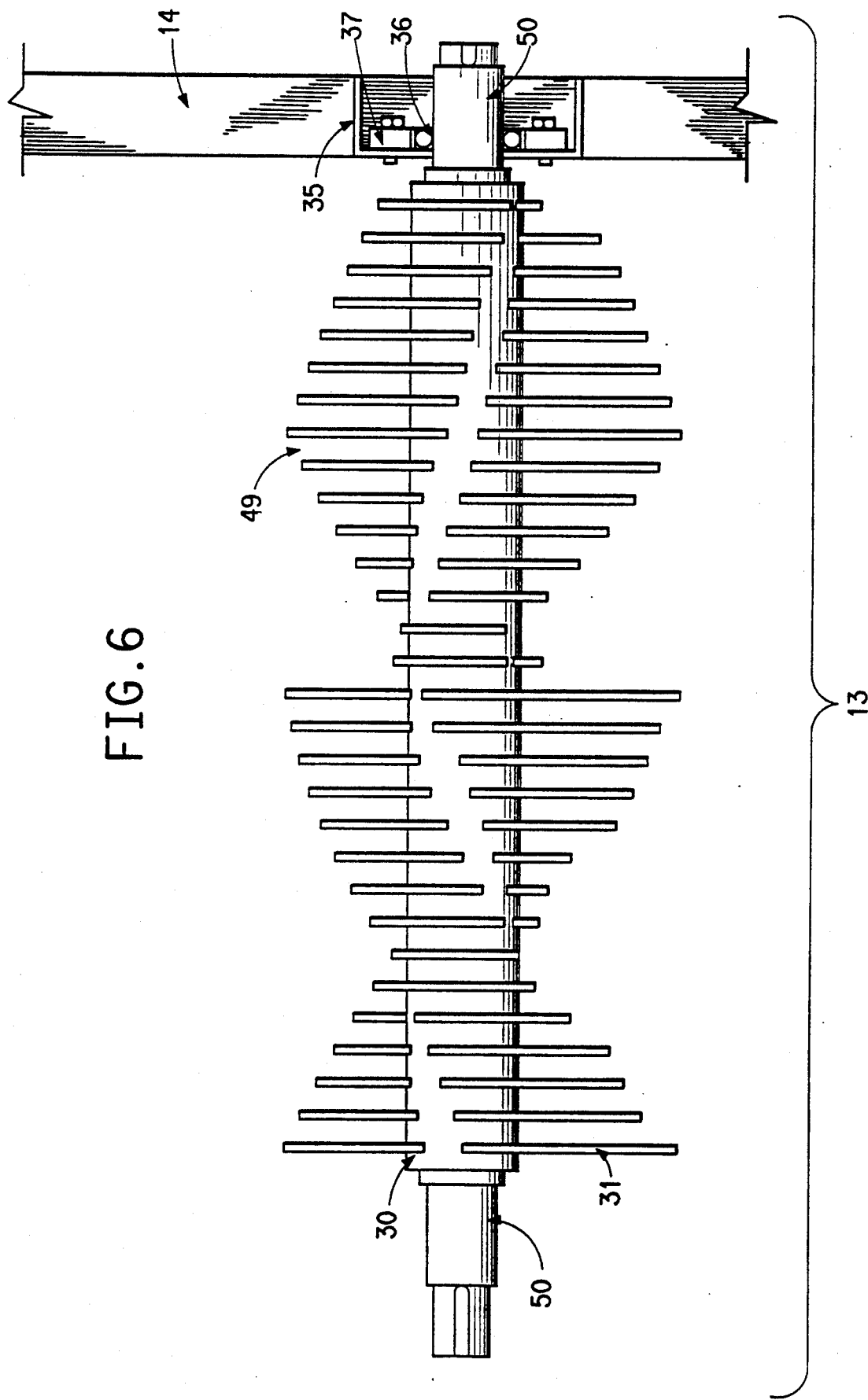
FIG. 6 is a front view of the rotor showing the sequential arrangement of the teeth over the main axle.

A slow rate of rotation is desirable according to the invention as a means of damaging, as slightly as possible, the forage tissue. A very fast rotation provides a chopping action which is undesirable. Nevertheless, a primary factor in the preferred design is the efficient use of power which depends on the efficiency of the compaction device design. The compaction device 5 as shown in FIG. 2 is a group of two sets of pieces, one is a rotor 13 and the other is a retainer 12. The rotor is a piece formed by a central axle 30 of variable length to which a number of teeth or prongs 31 have been attached (see FIGS. 5 and 6). The teeth 31, as shown in FIG. 4 are essentially individual pieces, flat in the lateral direction, convex in the front 32 and concave or vertical in the rear 33. Each of the teeth 31 (FIG. 4) are attached by the base 34 to the main axle 30 while the concave portion 33 and convex portion 32 borders join in a generally triangular fashion. The teeth are perpendicular to the main axle which is normally a tubular structure that is attached by way of trunnions 50 to the vertical elements 14 of the main frame 9 by way of a holding structure 35. The holding structure 35 supports ball bearings 36 inside a pillow block structure 37. On the left side, the rotor is attached to the main sprocket 28 from the power transfer system 23. The teeth are in variable numbers over the axle. Each of the teeth 31 are rotated forward in relation to the one on its side in such a way as to construct a sequence. Upon rotation of the axle, the edge of convex portion 32 of the teeth are presented to the forage in such a way that they move the chopped forage in a special way. As the axis and the teeth rotate, the border of the convex portion 32 of the teeth grab the forage and drive it through the passageway 38. The passage 38 is formed in the frame 9 that links the hopper 2 and the tunnel 17 in such a way that the effect of the movement is that of a combination of push and lift.

Figure 3:
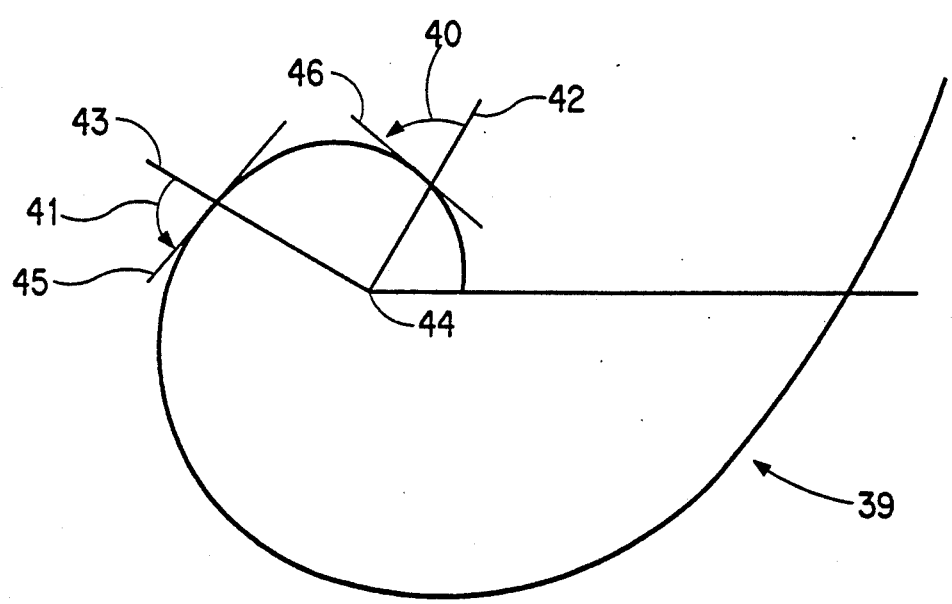
FIG. 3 is a general diagram of a logarithmic spiral according to mathematical definition.

This effect is achieved by the special design of the front or leading edge 32 of the teeth 31. The leading edge 32 is specifically designed on the basis of the logarithmic spiral concept. By definition, as seen in FIG. 3, in polar coordinates, a logarithmic spiral 39 is the curve where the angles formed by the straight radial projection 42, 43 of any line that originates at the pole or center of rotation of the curve 44, intersects said curve, always at the same angle such that all angles are identical. Since this description is mathematically not particularly convenient in polar coordinates except as a definition, it is more commonly referred to with the tangent 45, 46 formed at said point of intersection. If a straight radial line emerging from the pole or center of rotation 44 is projected and intersects the spiral line 39, and at such point of intersection a tangent is drawn, the angle 40, 41 which the tangent 45, 46 makes with the line from the pole through the point of tangency is always the same. This means that alongside the curve defined as a logarithmic spiral (FIG. 4), a point N in the curve, that is projected to the center of origin "O" by the line "N-O" will intersect the line at a constant angle. That way, an origin with the same angle, regardless of its position in the curve is so defined. If the front edge 32 of the teeth 31 of the rotor 13 is defined by a logarithmic equation that is centered in the rotation axis of the rotor 47, then it is stated that any line that intersects this front edge 32 and is directed towards the center of rotation 47 has a constant angle of intersection with such front edge 40, 41. In this particular situation, the equation used defines a curve that is intersected towards the center of rotation at 70 degrees at any point whereby the length for each teeth is an optimum at 10.4 inches. Naturally, many other angles and lengths could be defined although this is regarded as optimum for power requirements. Other angles could be used at a lesser degree of efficiency, but nevertheless their use is feasible according to the invention.

The second component of the compaction system 5 is the retainer 12 which is formed by a set of bars 48 that are directed downwards and forward in such a way that they occupy the space 49 between the teeth 31 of the rotor 13. These bars must be specifically directed towards the rear border of 30A the axle of the rotor 13 in such a way that the teeth 31 pass unmolested between the bars, from base 34 to vertex 34A of the teeth. By having a specific direction and almost leaning against the axle 30 of the rotor 13, the bars are actually tangential to said axle 30. Since the bars 48 are directed at about 28 degrees radial 51 with the vertical line that forms the base 52 of the whole retainer 12, in the general direction of the rotor 13, the bars 48 are actually tangential to the front edge 32 of the teeth 31 and, therefore, fulfill the definition of the logarithmic spiral 39 at a different angle than the one that defined the original curve at 70 degrees, due to the requirements of the design. This design provides for a desired angle of intersection 52 of the tangent line of any point over the designed front edge of the teeth with the retainer bar to be 90 degrees. Because of specific design, the bars of the retainer are directed downwards and forward at such an angle as to conform the required association with the front edge of the teeth in such a way that this angle of intersection 52 is 90 degrees.

Because of practical reasons of design, the intersection 52 may vary from 80 to 110 degrees. This was chosen to be as the minimum between a chopping effect and a simple pushing effect on the forage being compacted. Any angle of intersection 52 lower than 80 degrees has a pushing effect on the forage, in the general backwards direction, while any angle of intersection 52 higher than 110 degrees has the effect of cutting like scissors. Therefore the teeth 31 around the axis 30, that is, the rotor 13, and the retainer 12, are specifically designed and mathematically defined in such a way that a special compaction device 5 is formed by their association. The formulation that defines the teeth front edge is known per se but in this specific use it is required to act by design in unison with the retainer so that a specific amount and direction of force is generated by their associated and combined effect. The action is to push and elevate the forage. This is achieved by having an intersecting angle 52 of 90 degrees between the leading edge of rotor teeth 31 and retainer 12 that creates a force that is opposed by the forage being compacted and already in the tunnel 17.

Therefore, the resulting force is upwards and backwards along the entire compaction device 5. The direction of this force is generally at 45 degrees since it is created by, half the power of the rotor 13 and half by the resistance of the retainer bars 48 and the forage already inside the tunnel 17. This way, the compaction force direction must hit the roof 53 of the tunnel to be stopped physically. This way, the compacting pressure is fully within the tunnel 17. It may be emphasized that the size of the compaction device 5 is variable within the definition since its length, number of teeth, actual dimension of the teeth, and even the sequence along the main axle 30 is not necessarily related to the act of compaction. The concept of a logarithmic spiral 39 defining the front edge of the teeth 32, makes the use of power more efficient. In accordance with efficiency a sequence was chosen where each of he teeth are advanced approximately 12 degrees with respect to the tooth that is on its right side (as viewed from the rear). That way a simple and traditional spiral is formed by the organized sequence of teeth.

Any other design in the front or leading edge of the teeth will mostly pushing or cutting, creating the already mentioned problems with the compaction of the forage into the tunnel being too high or too low. The general compaction force generated by the compaction device 5 is projected into the tunnel 17 that hold the agricultural bag 54 and shapes the exiting forage. The pressure towards the open end 55 of the tunnel 17 is contained by a net 19 (see FIG. 1) that is supported by a frame 56 in the form of a backstop generally designated 59. This frame 56 stands straight, covering the entire exit 55 of the tunnel 17, leaning on two front supporting legs 57. A special bar 58 has been placed behind the frame 56 to resist the backward pressure generated by the compaction device 5 while compacting the forage into the tunnel. The backstop 59 is set in such a way that it blocks the exit of the tunnel 55 and the special support bar 58 acts as an element that prevents the backstop from falling backwards under pressure from the inside of the tunnel which is generated by the compaction device 5. This element is important in this concept since, by having a force that is directed backwards and upwards, the forage is being pressed into the tunnel 17 in the same general direction, that is backwards and upwards and this causes the compaction to occur in the entire tunnel. Therefore, at the exit 55 this brings a large amount of force into the upper parts of the backstop 59, not only the center or the lower parts. This pushes against the entire backstop 59 and a support bar 58 is helpful as reinforcement. This backstop is attached to the main frame 9 by a set of cables 20 that are wound in two drums 21, each on either side of the tunnel 17. The cables 20 project backwards, parallel to the tunnel 17, towards the backstop 59. The unwinding of these cables 20 is prevented by a brake system 11 that is usually applied to one of the drums 21. Since the drums are linked by a steel bar 60, both drums 21 move simultaneously and therefore, the brake system 11 located on one drum stops both. The brake system 11 is formed by a braking band 61, a braking lever 62 and a pressure device 63.

The braking band 61 is formed by a steel band 69 that supports a length of braking material 70 that contacts the drum 21. The braking band 61 starts at the base 64 of the braking lever 62 and surrounds the drum 21 in roughly 65 to 70% of the surface creating a large contact area 68. The other end 66 of the braking band 61 is located in the same braking lever 62, forwards or rearwards of the point of origin 64. The braking lever 62 moves back and forth according to the desired braking pressure. By doing such a movement, it pulls down the front end 66 of the braking band 61, actually shortening the braking band which means that there is increased direction between said band and the drum generating braking pressure. Due to the large surface of the brake this pressure is lower that most braking devices used in similar machines. The lower end f ht braking lever is driven by a pressure device 63 that cause the back and forth movements of the braking lever 62 towards and way from the upper beam 10 of the main frame 9 and therefore generates pressure. This pressure device 63 is anchored to a prong 71 that is welded to the upper beam 10 by its rear end, while it is attached to the lower end of the braking lever 62 in the front end where a flywheel 72 presses said lower end towards the pressure device 63. This pressure device 63 is a hydraulic embolus that could be formed by an inside piston that slides into a cylinder. Between the piston and cylinder a chamber is created where oil is kept. As the piston is pulled by the braking lever 62 through the action of the flywheel 72, pressure is increased inside said chamber. A manometer 64 is screwed to said pressure device in order to indicate amount of pressure generated. The pressure generated is a rough indicator of braking pressure and a relative indicator of tension of cable 20. As the compaction force increases pressure inside the tunnel 17, and increases the force against the backstop 59, the tension on the cables 20 is also increased until said tension overpowers the braking pressure on the drums 21 and the drums gyrate slightly. This allows a proportional amount of cable to unwind until a new equilibrium is reached between tension in the cables and the brake force. Located at the base of the braking lever 62 there are tow screws 66A that are used to adjust the relative length of the braking band 61 as the inner braking material wears out with time and use. Since tension in the cables is a function of the compaction of the forage inside the tunnel, the harmonious unwinding of the cables in unison and in association with the increasing pressure inside the tunnel, generates a forward movement of the apparatus. This movement permits the unfolding of the agricultural bag 18 that is left behind the apparatus, holding the forage, at a relatively even pressure inside the agricultural bag. This pressure is distributed evenly along the bag due to the combination of forces; the initial compaction force into the tunnel 17 as described, the exiting force in the tunnel exit 55 and the pressure against the backstop 59 held by the cables 20 which are held by the brake system 11 on the drums 21. The apparatus moves forward, as these forces play their role in the appropriate direction, forming an agricultural bag that by being evenly filled, creates an adequate environment for fermentation and ensiling. This movement continues until the bag is exhausted. Then, a new bag must be placed around the tunnel and the cycle starts again. The cables 20 are wound around the drums 1 in an orderly fashion and are initially directed downwards, towards a cylinder 72 under the upper beam 10 of the main frame 9. This cylinder is near the point of attachment 35 of the rotor 13 with the main frame 9, just outside the main sprocket 36 in order to bring the tension created by the cables 20 during work, closer to the actual sources of compaction force, which is the compaction device 11. Just after sliding over the cylinder, the cables are directed backwards towards the backstop 59. By don this initial downward displacement, the cables 20 bring the center of gravity of the machine to a lower level, lower than said center of gravity would be if the cables 20 leave the drums 21 directly. This has the effect of keeping the front end of the machine and particularly the front ski 7 firmly on the ground, without the tendency of lifting that comes due to the drums 21 being on a elevated part of the man frame 9. This creates a torque force that is large when the source of compaction ( the rotor 13 and the retainer 12) and the point of resistance (the drums 21) are widely separated. In the described design, the compaction device and the drums are almost in the same plane of action by which the center of gravity of the apparatus is kept low. The association of a large surface area of the braking band 61 with the elements that create a lower center of gravity help the apparatus create a powerful enough compaction force with less stress in the components of the equipment. During work, the cables 20 will unwind from the drums 21 until the length of cable is exhausted. The cables 20 may be rewound by different means, mechanical or hydraulic. Normally the cables are rewound by levers that are hooked to the end of the bar 60 in its outermost ends. The orderly rewinding process is helped by the use of an aligner 67 that keeps the cables 20 in one layer over the drums 21.

The tunnel 17 is located behind the main frame 9, so as to conform the receiving end of the passageway 38 that links the hopper 3 and said tunnel. The outer part 54 of the tunnel frame holds the agricultural bag 18 is position around said tunnel. For this purpose it has small beams 76 that reinforce the tunnel and help keep the agricultural bag in position in order to facilitate the unfolding. The inside of the tunnel has a forming sheet 53 that starts at the attachment point of the retainer 12 with the upper beam 10 of the main frame 9. From this location it is displaced in the general backwards and upwards direction in a curved fashion, forming a dome like structure that joins the outer part 54 at the general area where the compaction forces reach the tunnel roof. It helps create the pressure chamber inside the tunnel by diverting backwards the forage being lifted by the compaction device 5.

Below the tunnel 17, there is a pan 77 designed to hold the lower part of the agricultural bag in place so that when the compacted forage exits the rear end of the tunnel, the bag is evenly pulled out. The pan is attached to the main frame 9 by two prongs that are welded to the lower beam 15. On each side of the rear border of the pan 77 there are attachments 78 to hold a set of chain and springs 9 that permit the tensioning of the pan against a lever 80. Since the bag 18 is already surrounding the tunnel, the lower part, held in position by the pan 77 is pulled out evenly with the rest. The supporting chains and springs et the required exit tension for the bag in the lower border of the tunnel 17.

The front part of the machine 81 receives a tow bar for apparatus transportation (see FIG. 9). IT is also to be connected to the beams that link the apparatus to the tractor, if this is the power source desired to push forward the tractor during the compaction process. This bar could have several designs and the preferred embodiment provides a telescopic bar 82, that connects the left front corner (as seen from behind) of the main frame 9 by way of a holding pin 86 to the tractor where another holding pin 87 is located. The telescopic bar is 82 formed by an outer bar 88 and an inner bar 86 with interconnecting holes so that the total length of the bar is variable and adjustable with holding pins. The telescopic bar 82 is surrounded by a brace 83 that allows for the linkage of the telescopic bar 82 with a side bar 84. The brace 83 is attached to the telescopic bar by way of tightening screws.

This association permits the extension of the telescopic bar 82 towards the hitch point of the tractor at the desired angle by moving one bar of the telescopic unit 89 into the other 88 and securing them with hitch pins. This way, the telescopic bar joins the apparatus and the tractor, but since the apparatus could be displaced, as the agricultural bag 18 fills, and the apparatus moves forward, there is a side bar 84 that links that brace 83 to the central attachment point 85, located at the tow bar point 81, that provides a limit to the prevent displacements. This way, the connection is secure and the tractor could be positioned in accordance to the front end design. If it si a simple hopper 2 the tractor is located more towards the left side of the machine while if the apparatus is equipped with a side conveyor and a special hopper 3 the tractor could be more in front of the apparatus. If a design with a feed table 4 is desired, the tractor could be pushed significantly to the left side by ways of the side pulley connection with the PTO. This system give this particular design a potential to work with different unloading wagons by ways of changing the hopper only.

While a specific embodiment of the invention has been shown and described in detail to illustrate the application of the principles of the invention, it will be understood that the invention may be embodied otherwise without departing form such principles.

What is claimed and desired to be secured by Letters of Patent of the United States of America is:

1. A rotor for discharging material, the rotor comprising:
   a housing;
   a main axle mounted in said housing, said main axle having a rotation means for rotating said main axle with respect to said housing;
   a plurality of teeth extending from said main axle, each of said plurality of teeth having a leading edge;
   a comb formed by a plurality of bars extending from said housing at a position above and downstream of said main axle, said plurality of bars extending in between said plurality of teeth and in a downwardly and upstream direction, said plurality of bars being angled with respect to said main axle and said leading edge of said plurality of teeth being curved in order for a substantially 90° angle to be formed between said bars and said leading edge wherever said leading edge intercepts said bars.

2. A rotor in accordance with claim 1, wherein:
   said leading edge has a curve substantially defined by a logarithmic polar equation centered at a rotational axis of said main axle.

3. A rotor in accordance with claim 1, wherein:

an angle between said leading edge and a radius extending from said main axle is substantially constant during an entire portion of said leading edge.

4. A rotor in accordance with claim 3, wherein:
said angle is measured between said radius and a tangent to said leading edge at a point of intersection between said radius and said leading edge.

5. A rotor in accordance with claim 3, wherein:
said angel is substantially 70°.

6. A rotor in accordance with claim 1, wherein:
said leading edge intersects with said bars in a manner to cause matter on said leading edge to slide up said bars.

7. A rotor in accordance with claim 1, wherein:
said teeth are positioned in a double helix pattern on said main axle.

8. A rotor in accordance with claim 1, wherein:
said plurality of bars extend to reach a lower border of said main axle.

9. A forage compaction apparatus comprising:
a housing;
a main axle mounted in said housing, said main axle having a rotation means for rotating said main axle with respect to said housing;
a hopper located on said housing and on a upstream side of said main axle, said hopper directing forage toward said main axle;
a plurality of teeth extending from said main axle, each of said plurality of teeth having a leading edge;
a comb formed by a plurality of bars extending from said housing at a position above and downstream of said main axle, said plurality of bars extending in between said plurality of teeth and in a downwardly and upstream direction, said plurality of bars being angled with respect to said main axle and said leading edge of said plurality of teeth begin curved in order for a substantially 90° angel to be formed between said bars and said leading edge wherever said leading edge intercepts said bars;
a tunnel chamber located on a downstream side of said housing, said tunnel chamber having a roof arched to form a posterior projection of said main axle and said comb.

10. A rotor in accordance with claim 9, further comprising:

a silage discharge exit located at a rearmost wall of said tunnel chamber;
an agricultural bag with support means for supporting said agricultural bag around said tunnel chamber, a closed ned of said bag being located at said silage discharge exit;
a pair of wheels engaged laterally to said housing;
a skid plate mounted to an upstream end of said housing;
a power transmissions system for receiving power and transmitting power to said main axle, said lower transmission system having chains and sprockets to adjust rotational speed of said main axle; and
compaction control means for controlling compaction inside said tunnel chamber.

11. An apparatus in accordance with claim 10, further comprising:
a backstop located behind said closed end of said agricultural bag and covering said discharge exit;
a set of cables wound on a drum located on said housing;
a brake band located around said drum so as to control unwinding of said set of cables;
a lever used as a shortening element for said brake band; and
a tension means located on said housing and for pulling said lever so as to cause and indicate relative tension of said brake band.

12. An apparatus in accordance with claim 11, wherein:
said hosing has an upstream and a downstream end;
said pair of wheels are positioned at said downstream end of said housing;
said ski plate is located at said upstream end of said housing, the housing resting fully on a ground surface by said ski and said pair of wheels;
a sliding tube means located under said drum for deflecting said cables from said drum.

13. An apparatus in accordance with claim 9, wherein:
said leading edge has a curve substantially defined by a logarithmic polar equation centered at a rotational axis of said main axle, a downstream side of said bars forming said substantially 90° angle with said leading edge at substntailly all points of engagement between said leading edge and said downstream side of said bars during rotation of said main axle.

* * * * *